United States Patent
Van Stralen et al.

(10) Patent No.: US 6,506,160 B1
(45) Date of Patent: Jan. 14, 2003

(54) FREQUENCY DIVISION MULTIPLEXED WIRELINE COMMUNICATION FOR ULTRASOUND PROBE

(75) Inventors: Nick Andrew Van Stralen, Clifton Park, NY (US); Ralph Thomas Hoctor, Saratoga Springs, NY (US); Richard Louis Frey, Delanson, NY (US); Bruno Hans Haider, Ballston Lake, NY (US); John Erik Hershey, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 24 days.

(21) Appl. No.: 09/668,980

(22) Filed: Sep. 25, 2000

(51) Int. Cl.[7] ................................................. A61B 8/14
(52) U.S. Cl. ...................................................... 600/459
(58) Field of Search ......................... 600/437, 443–447, 600/458, 459, 472; 367/7, 11, 88, 130; 73/625, 626, 602; 310/320; 340/870.13; 128/916

(56) References Cited

U.S. PATENT DOCUMENTS

| | | | | |
|---|---|---|---|---|
| 4,472,793 A | * | 9/1984 | Benjaminson | 340/870.13 |
| 4,549,533 A | * | 10/1985 | Cain et al. | 310/320 |
| 4,569,231 A | * | 2/1986 | Carnes et al. | 73/626 |
| 5,566,133 A | | 10/1996 | Engeler et al. | |
| 5,591,911 A | * | 1/1997 | Masuzawa et al. | 367/88 |
| 5,622,177 A | * | 4/1997 | Breimesser et al. | 600/459 |
| 5,787,049 A | * | 7/1998 | Bates | 367/103 |
| 5,848,968 A | * | 12/1998 | Takeuchi | 600/458 |
| 6,159,153 A | * | 12/2000 | Dubberstein et al. | 128/916 |

OTHER PUBLICATIONS

J.G. Proakis and M. Salehi, Communication Systems Engineering, Prentice–Hall, 1994, p. 323.

* cited by examiner

Primary Examiner—Marvin M. Lateef
Assistant Examiner—Ali M. Imam
(74) Attorney, Agent, or Firm—Jean K. Testa; Patrick E. Patnode

(57) ABSTRACT

Received echo data are transferred from an ultrasound probe to the signal processing circuitry of an ultrasound imaging system by use of a reduced number of multiple coaxial cables. The system operates by frequency division multiplexing of the analog output signals produced by multiple individual array elements in the probe onto a single coaxial cable, which connects the probe to the central host computer or console for conventional signal processing and imaging.

12 Claims, 5 Drawing Sheets

FREQUENCY DIVISION MULTIPLEXED WIRELINE COMMUNICATION FOR ULTRASOUND PROBE

FIELD OF THE INVENTION

This invention generally relates to ultrasound imaging systems. In particular, the invention relates to methods and apparatus for imaging moving fluid and tissue.

BACKGROUND OF THE INVENTION

Ultrasonic imaging systems, as commonly used for medical imaging, require an array of ultrasonic transducers contained within a probe to provide steering and focusing of the ultrasonic beam. Each transducer transmits a high-frequency signal into the object being examined and receives a high-frequency echo signal returned from the object following transmission. In particular, respective transmit pulses are transmitted to the transducers of the probe from a transmit beamformer incorporated in the host electronic system or image console. The echo signals detected by the transducers of the probe must then be transmitted to the host electronic system or image console for receive beamforming and signal processing. Even with advanced very-large-scale integration microelectronics techniques, only a relatively small part of the overall system electronic signal processing may reside in the probe.

The maximum number of simultaneously active elements in a transducer array of a medical diagnostic ultrasound probe has steadily grown over the past 15 years. This trend continues and may actually accelerate, due to the use of large two-dimensional apertures in three-dimensional image reconstruction systems. If a separate coaxial cable is used to convey the detected echo signal obtained from each of a large number of transducer array elements of the ultrasound probe to the main signal processing unit, then the bundle of cables attached to the probe can become stiff, making manipulation of the probe for imaging difficult. Probes with roughly 500 cables are commercially available, but they are regarded as relatively clumsy. On the other hand, probes with 128 cables are routinely used by sonographers without complaint.

This problem has been recognized for some time and some innovations have been proposed to address it. One solution was proposed in U.S. Pat. No. 5,566,133, which discloses a method whereby the coaxial cables are replaced by fiber-optic cables. Since fiber-optic cables are more flexible, a larger number can be used while retaining ease of maneuverability of the probe. However, in order to transmit signals with the required dynamic range, this method requires the use of digital optical modulation, which in turn requires that time-gain compensation and analog-to-digital conversion functions be incorporated in the probe for each array element. This involves a considerable amount of power to operate and can be relatively expensive to manufacture. Thus there is a need for a technique whereby the detected echo signals for the multiplicity of transducers in the probe can be communicated to the host signal processing electronics without need to incorporate one coaxial cable for each transducer.

SUMMARY OF THE INVENTION

Communication between a large number of ultrasonic transducers incorporated in a probe and a central electronic unit or computer of an ultrasound imaging system by means of coaxial cables can require fewer cables than the number of transducers by using frequency division multiplexing to enable a single coaxial cable to carry the signals from multiple ultrasound transducers in an array. The invention enables a bundle of, for example, 128 coaxial cables to be used to transport the signals originating from an array of, for example, 1024 active transducers or elements. In this example, the ratio of active array elements to coaxial cables is 8:1. Such a ratio requires frequency division multiplexing of eight separate array elements onto a single coaxial cable, which requires that the single coaxial strand have relatively high bandwidth. For example, to multiplex element output data from a 5-MHZ probe at an 8-to-1 ratio would require in excess of 80 MHz (two-sided) bandwidth on the individual coaxial cable. This might require that the gage of the individual strand be increased, and a good trade-off may have to be found between multiplex ratio, cable gage and flexibility of the bundle of coaxial cables.

In accordance with the preferred embodiments of the invention, different modulation schemes for individual signals can be utilized. The final choice between these methods will depend on the available frequency response characteristics of the individual coaxial cables. In accordance with one preferred embodiment, if the cable bandwidth is limited, single-sideband, suppressed-carrier amplitude modulation can be used to pack the element output signals into the available bandwidth. This would require filtering the mixer output signal to reject image spectra prior to signal addition. In accordance with another preferred embodiment, if cable bandwidth is large (or if high-bandwidth cables could be obtained to replace those currently in use), then double-sideband, suppressed-carrier amplitude modulation could be used. Although this would be wasteful of bandwidth, it would allow the element output data to be communicated from the probe to the central electronic processing unit or computer without filtering for rejection of frequency-domain images. It would be advantageous to implement the modulation without filtering, but, again, this depends on cable bandwidth.

DETAILED DESCRIPTION OF THE PREFERRED EMBODIMENTS

Figure 1:
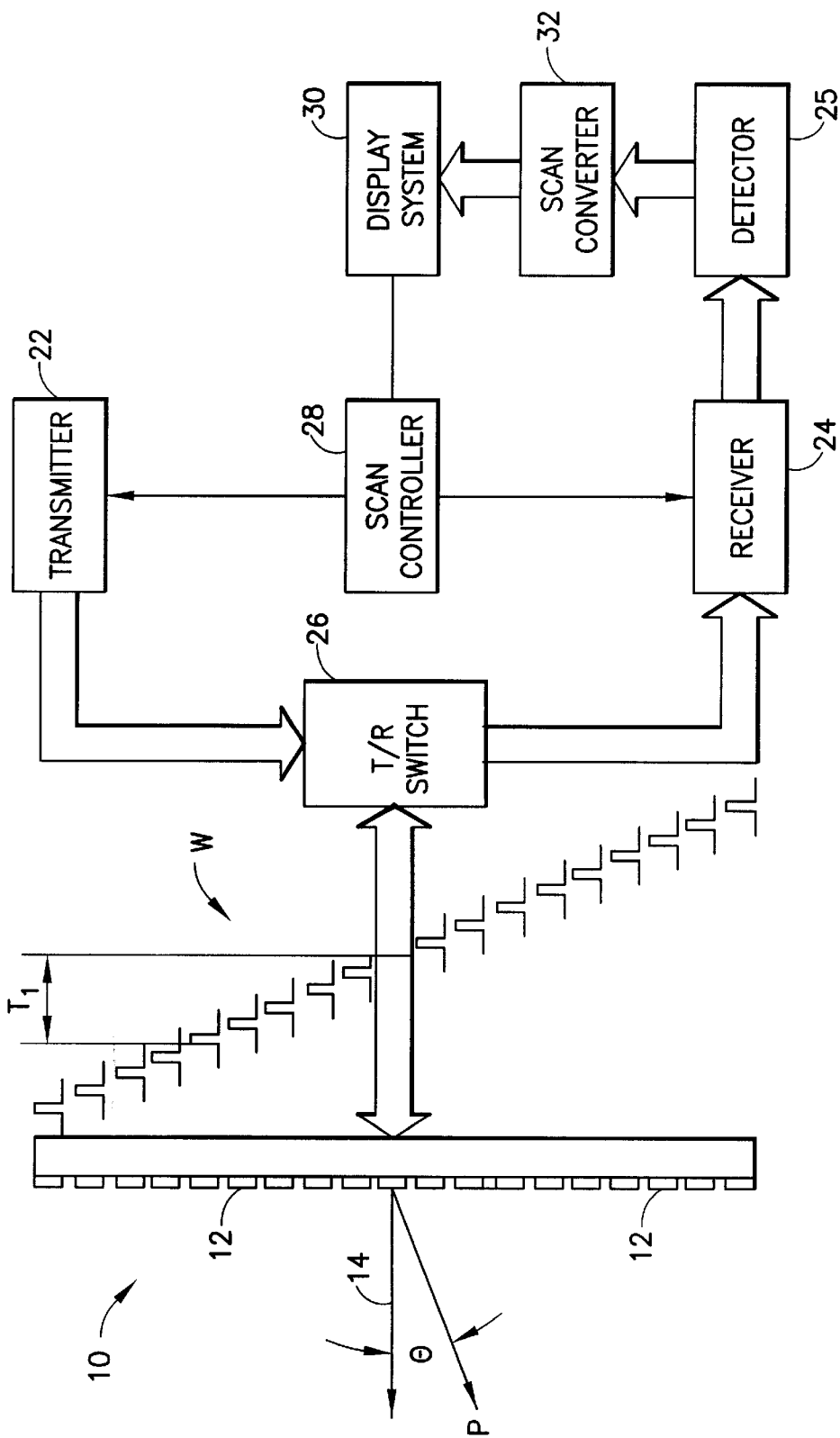
FIG. 1 is a block diagram showing the major functional subsystems within a conventional real-time ultrasound imaging system.

A conventional ultrasonic imaging system, as shown in FIG. 1, comprises an ultrasound probe 10 having a multiplicity of separately driven transducer elements 12, each of which produces a burst of ultrasonic energy when energized by a pulsed waveform produced by a transmitter 22. The ultrasonic energy reflected back to the transducer array from the object under study is converted to an electrical signal by each receiving transducer element 12 and communicated via separate coaxial cables to a receiver 24 through a set of transmit/receive (T/R) switches 26. T/R switches 26 are typically diodes which protect the receive electronics from the high voltages generated by the transmit electronics. The transmit signal causes the diodes to shut off or limit the signal to the receiver. Transmitter 22 and receiver 24 are operated under control of a scan controller 28 responsive to commands by a human operator. A complete scan is performed by gating transmitter 22 ON momentarily to energize each transducer element 12, and acquiring the subsequent echo signals produced by each transducer element 12 which are applied to receiver 24. A channel may begin reception while another channel is still transmitting. Receiver 24 combines the separate echo signals from each transducer element to produce a single echo signal which is used to produce a line in an image on a display monitor 30.

Transmitter 22 drives transducer elements 12 of the array such that the ultrasonic energy produced is directed, or steered, in a beam. To accomplish this, transmitter 22 imparts a time delay to the respective pulsed waveforms W that are applied to successive transducer elements 12 via respective beamformer channels. Each channel has a respective pulser (not shown) associated therewith. By adjusting the pulse time delays appropriately in a conventional manner, the ultrasonic beam can be directed away from axis transducer 14 by an angle θ and/or focused at a fixed range R. A sector scan is performed by progressively changing the time delays in successive excitations. The angle θ is thus changed in increments to steer the transmitted beam in a succession of directions.

The echo signals produced by each burst of ultrasonic energy reflect from objects located at successive ranges along the ultrasonic beam. The echo signals are sensed separately by each transducer element 12 and the magnitude of the echo signal at a particular point in time represents the amount of reflection occurring at a specific range. Due to differences in the propagation paths between a reflecting point P and each transducer element 12, however, these echo signals will not be detected simultaneously and their amplitudes will not be equal. Receiver 24 amplifies the separate echo signals, imparts the proper time delay to each, and sums them to provide a single echo signal which accurately indicates the total ultrasonic energy reflected from point P located at range R along the ultrasonic beam oriented at the angle θ.

To simultaneously sum the electrical signals produced by the echoes impinging on each transducer element 12, time delays are introduced into each separate beamformer channel of receiver 24. The beam time delays for reception are the same delays as the transmission delays described above. However, the time delay of each receiver channel is continuously changing during reception of the echo to provide dynamic focusing of the received beam at the range R from which the echo signal emanates.

Under the direction of scan controller 28, receiver 24 provides delays during the scan such that steering of receiver 24 tracks the direction θ of the beam steered by transmitter 22 and provides the proper delays and phase shifts to dynamically focus at points P along the beam. Thus, each transmission of an ultrasonic pulse waveform results in acquisition of a signal with a magnitude which represents the amount of reflected sound from anatomy located along the ultrasonic beam.

A detector 25 converts the received signal to display data. In the B-mode (gray scale), this is the envelope of the signal with some additional processing such as edge enhancement and logarithmic compression.

A scan converter/interpolator 32 receives the display data from detector 25 and converts the data into the desired image for display. In particular, the scan converter converts the acoustic image data from polar coordinate (R-θ) sector format or Cartesian coordinate linear format to appropriately scaled Cartesian coordinate display pixel data at the video rate. These scan-converted acoustic data are then supplied for display on display monitor 30, which images the time-varying amplitude of the envelope of the signal as a gray scale.

Figure 2:
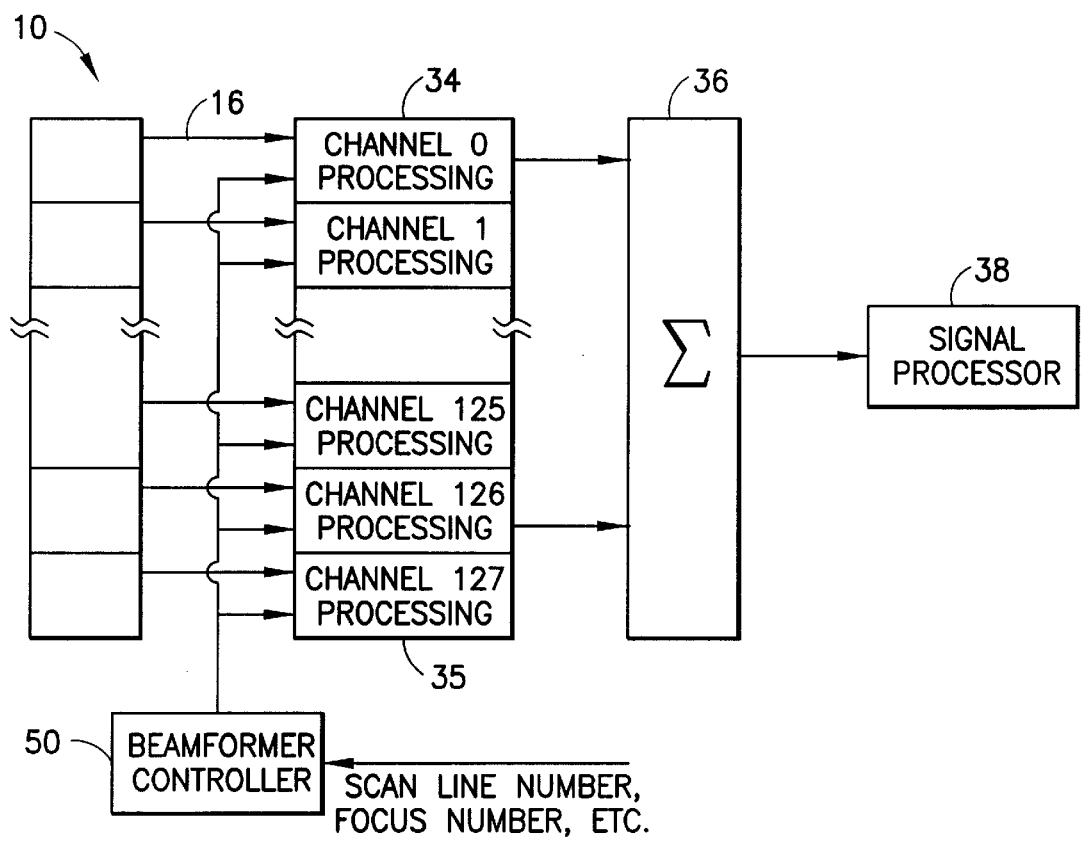
FIG. 2 is a block diagram of a typical 128-channel receive beamformer for the system depicted in FIG. 1.

FIG. 2 shows the receiver comprising a receive beamforming section 34, a beamsummer 36 and a signal processor 38. The receive beamforming section 34 of receiver 24 includes separate beamformer channels 35. Each beamformer channel 35 receives an analog echo signal from a respective transducer element via a respective coaxial cable 16. A beamformer controller 50 converts scan line and transmit focus numbers to addresses in a channel control memory (not shown). Scan controller 28 (FIG. 1) and beamformer controller 50 (FIG. 2) are configured by the host system which is controlled by the system operator. The output signals of beamformer channels 35 are summed in beamsummer 36.

In the prior art system depicted in FIG. 2, 128 active transducer array elements are respectively connected to 128 receive beamformer channels via 128 coaxial cables. Thus, each coaxial cable carries the output signal from only one active transducer array element. In accordance with the preferred embodiments disclosed hereinafter, each coaxial cable carries the output signals from multiple active transducer array elements.

Figure 3:
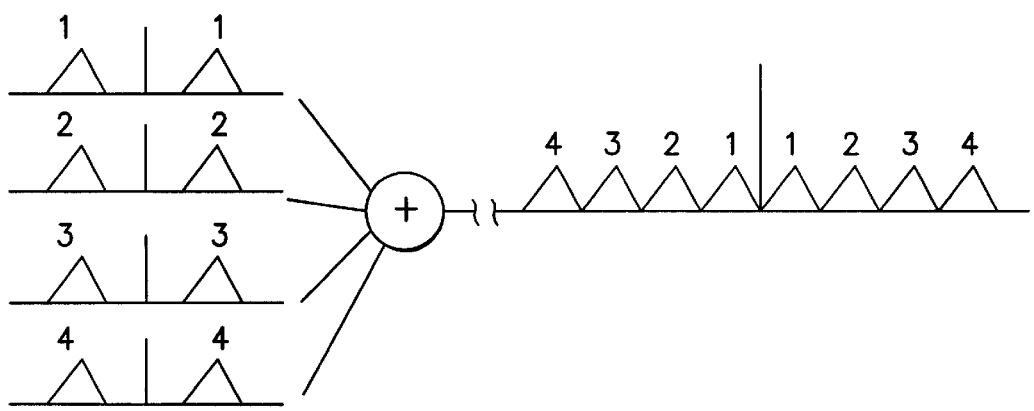
FIG. 3 is a frequency domain diagram of the modulation plan for a frequency division multiplexing assembly at a multiplexing ratio of 4:1 for single-sideband, suppressed-carrier amplitude modulation in accordance with a preferred embodiment of the invention.

In accordance with the preferred embodiments, the output signals from multiple transducer array elements are frequency shifted to have different center frequencies. These frequency-shifted output signals are then combined into one amplitude-modulated signal, which is communicated to the central processor or computer via a single coaxial cable. FIG. 3 depicts a modulation plan for a frequency division multiplexing assembly at a multiplexing ratio of 4:1 using single-sideband, suppressed-carrier amplitude modulation. Other ratios would work in a similar manner. The left-hand side of FIG. 3 represents the output data spectra (in the frequency domain) for four transducer elements, the spectra being respectively numbered 1 through 4. The vertical line represents a frequency of zero, while each inverted V represents a spectrum of frequencies. The output signal from each of the four transducer elements is amplified, bandpass or low-pass filtered, and then modulated using single-sideband, suppressed-carrier (SSB-SC) amplitude modulation to form a single amplitude-modulated signal. In order to pack the element output signals into the available bandwidth, the mixer (not shown) output signal is filtered to reject image spectra prior to signal addition. Component amplitude-modulated signals are added for transmission on a single coaxial cable. The spectrum of this SSB-SC signal is depicted (in the frequency domain) on the right-hand side of FIG. 3, with the numbers 1 through 4 indicating the respective inverted V-shaped spectra of the SSB-SC signals from transducer elements 1 through 4. This spectral diagram depicts the ideal situation where the respective spectra for the modulated output signals from the respective transducer elements are non-overlapping.

Figure 4:
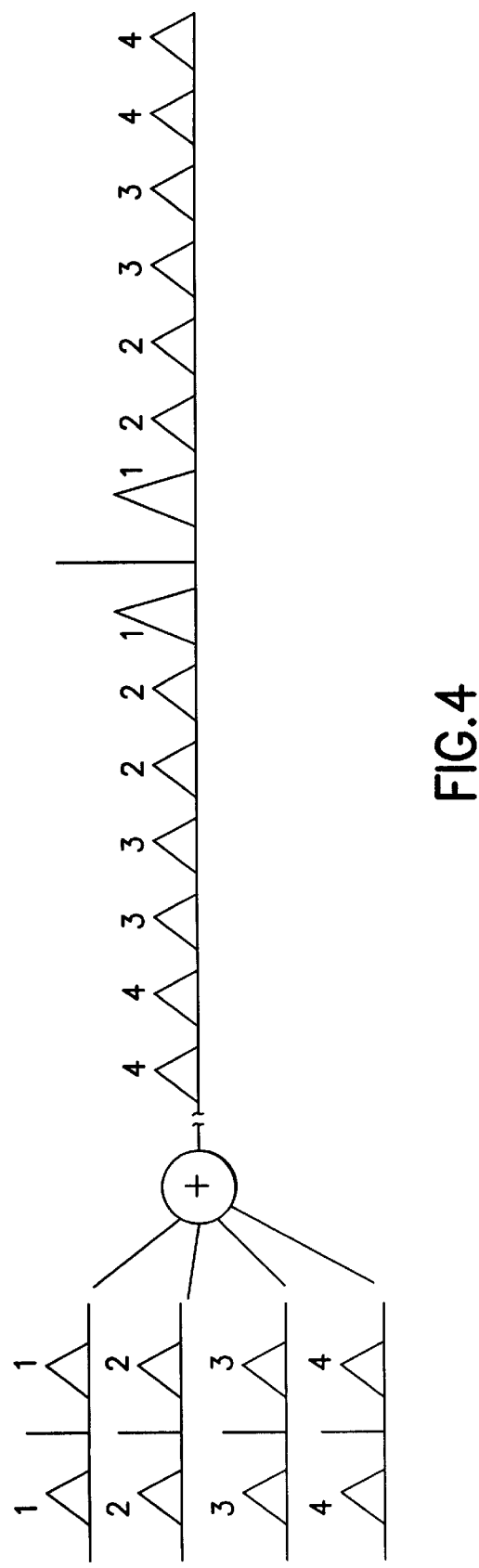
FIG. 4 is a frequency domain diagram of the modulation plan for a frequency division multiplexing assembly at a multiplexing ratio of 4:1 for double-sideband, suppressed-carrier amplitude modulation in accordance with another preferred embodiment of the invention.

FIG. 4 depicts a modulation plan for a frequency division multiplexing assembly at a multiplexing ratio of 4:1 using double-sideband, suppressed-carrier (DSB-SC) amplitude modulation. Since DSB-SC amplitude modulation requires a bandwidth wider than that required for SSB-SC amplitude modulation, the DSB-SC modulation technique can be used only if the bandwidth of the cable is sufficiently large. The left-hand side of FIG. 4 is the same as that in FIG. 3. The output signal from each of the four transducer elements 1 through 4 is amplified, bandpass or low-pass filtered, and then modulated using double-sideband, suppressed-carrier (DSB-SC) amplitude modulation to form a single amplitude-modulated signal. In contrast to the embodiment using SSB-SC, the mixer output signal in the DSB-SC embodiment is not filtered prior to signal addition. The spectrum of the combined DSB-SC signal is depicted (in the frequency domain) on the right-hand side of FIG. 4.

In either the SSb-SC or DSB-SC embodiment, the signal from each array element is amplified, band-pass or low-pass filtered and modulated to form a single amplitude-modulated signal. The input filtering can be done with operational amplifiers, and thus be compact and require low power. The mixing can be done with sufficient dynamic range so that the amplification can be non-time-varying. Component amplitude-modulated signals are added for transmission on a single coaxial cable. Received signals can be equalized at the receiver, as part of the host electronics.

Because a large number of signals are modulated to the same frequency in this scheme, pilot tones can be transmitted and shared between channels, provided that the modulations are performed using a single local oscillator. (This is a standard technique in frequency division multiplexing systems.) If local oscillators are shared among multiple mixers having the same carrier frequency but feeding different cables (and so different frequency division multiplexing assemblies), then one or more cables can be dedicated to a set of pilot tones for the frequencies making up the frequency division multiplexing assembly. This will supply carrier phase to the receiver for each component signal which had been modulated with one of these tones, while retaining the efficiency of transmitting suppressed carrier signals.

Figure 5:
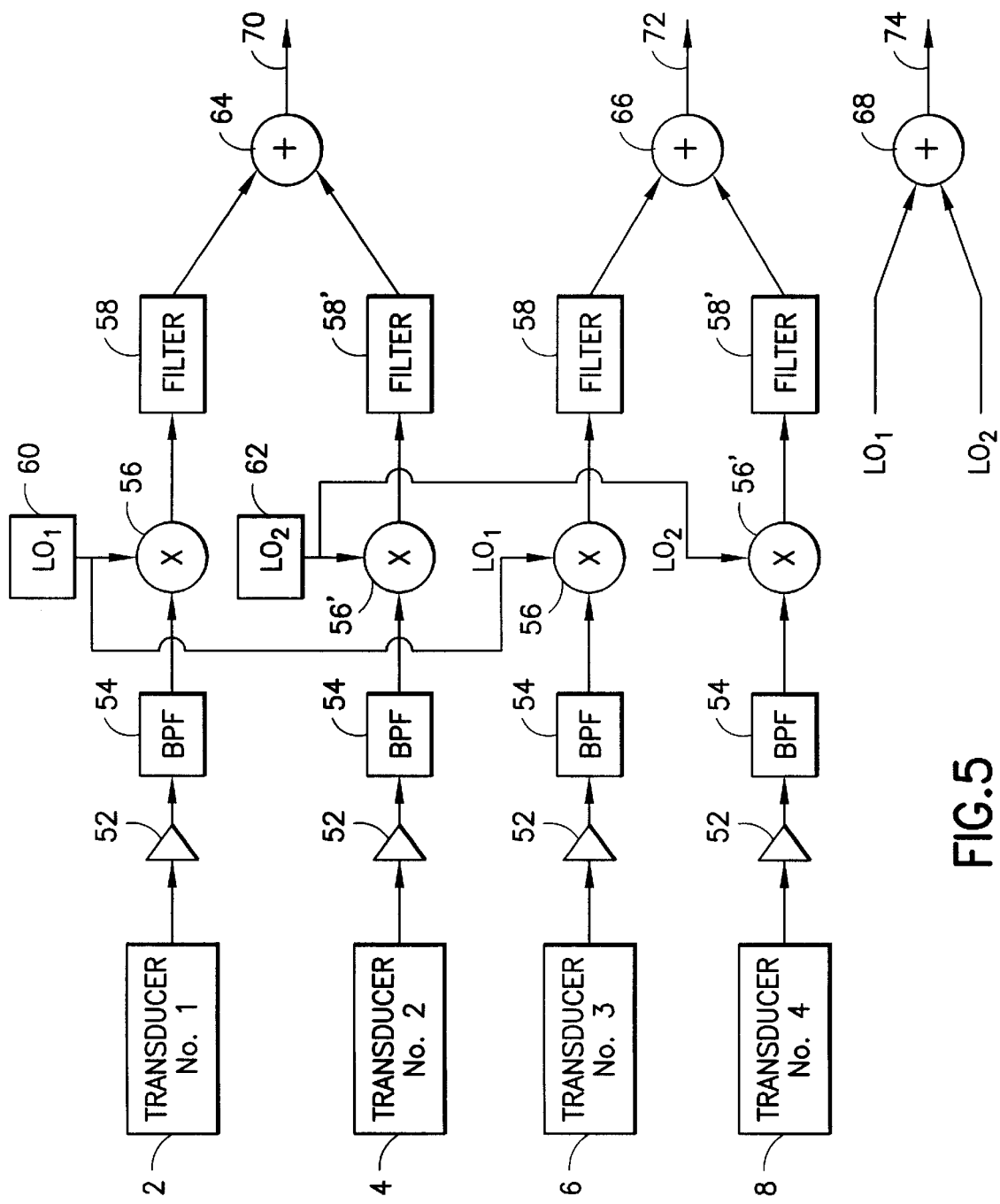
FIG. 5 is a block diagram of the scheme for frequency division multiplexing in accordance with the preferred embodiments of the invention.

The probe in accordance with the preferred embodiment is shown in FIG. 5, which illustrates a 2:1 multiplexing scheme. It should be understood that the 2:1 multiplexing scheme is selected for the sake of simplicity of description. Preferably the multiplexing ratio will be greater than 2:1, e.g., 8:1. For the same purpose of simplifying the description, a set M of only four transducers 2, 4, 6 and 8 is shown in FIG. 5. Obviously the transducer array will have many sets of four elements e.g., 256 sets of four elements, or 1024 elements. In a 2:1 multiplexing scheme, the output signals from each set of four transducers are communicated to four receive channels of the receive beamformer (not shown in FIG. 5) via N or two coaxial cables 70 and 72. If, in this example, the total number of transducer elements is 1024, then M×N×1024 and N=1024÷2, or 512 coaxial cables. However, it will be readily appreciated that utilization of an 8:1 multiplexing scheme requires the arrangement shown in FIG. 5 to be extended to show output signals from each set of M=16 transducer elements of the array being multiplexed to N=2 coaxial cables. In that event, each summer 64, 66 combines the output signals from a respective set of eight transducer elements and the number of transducer elements in the array is M×N or 16, although, for this latter example, if M×N=1024, then N=1024−8=128 coaxial cables.

The output signal from each transducer element 2, 4, 6, and 8 is amplified by a respective amplifier 52 and is bandpass filtered by a respective bandpass filter 54 centered at the transmit frequency. The amplified and filtered output signals which originated from transducer elements 2 and 6 are each modulated with a first carrier frequency $f_1$ in a respective mixer 56. Frequency $f_1$ is provided to the mixers 56 by a first local oscillator ($LO_1$) 60. The amplified and filtered output signals which originated from transducer elements 4 and 8 are each modulated with a second carrier frequency $f_2$ in a respective mixer 56'. Frequency $f_2$ is provided to the mixers 56' by a second local oscillator ($LO_2$) 62. The modulated signals result-ing from mixing with the first carrier frequency $f_1$ are low-pass filtered by respective low-pass filters 58, while the modulated signals resulting from mixing with the second carrier frequency $f_2$ are low-pass filtered by respective low-pass filters 58'. The difference between the carrier frequencies $f_1$ and $f_2$ is selected such that the output signals of low-pass filters 58 and 58' are substantially non-overlapping. These non-overlapping filter output signals are then combined in a respective summer. Summer 64 sums the modulated signals supplied from the outputs of transducers 2 and 4, while summer 66 sums the modulated signals supplied from the outputs of transducers 6 and 8.

The frequency division multiplexed signals from summers 64 and 66 are carried by first and second cables 70 and 72, respectively, to the receiver of the central signal processing unit or computer. The carrier frequencies $f_1$ and $f_2$ from local oscillators 60 and 62 are combined in a summer 68 on the probe, the combined carrier frequencies being sent via a third cable 74 to supply carrier phase to the receiver for each component signal which has been modulated with one of these carrier frequencies.

Figure 6:
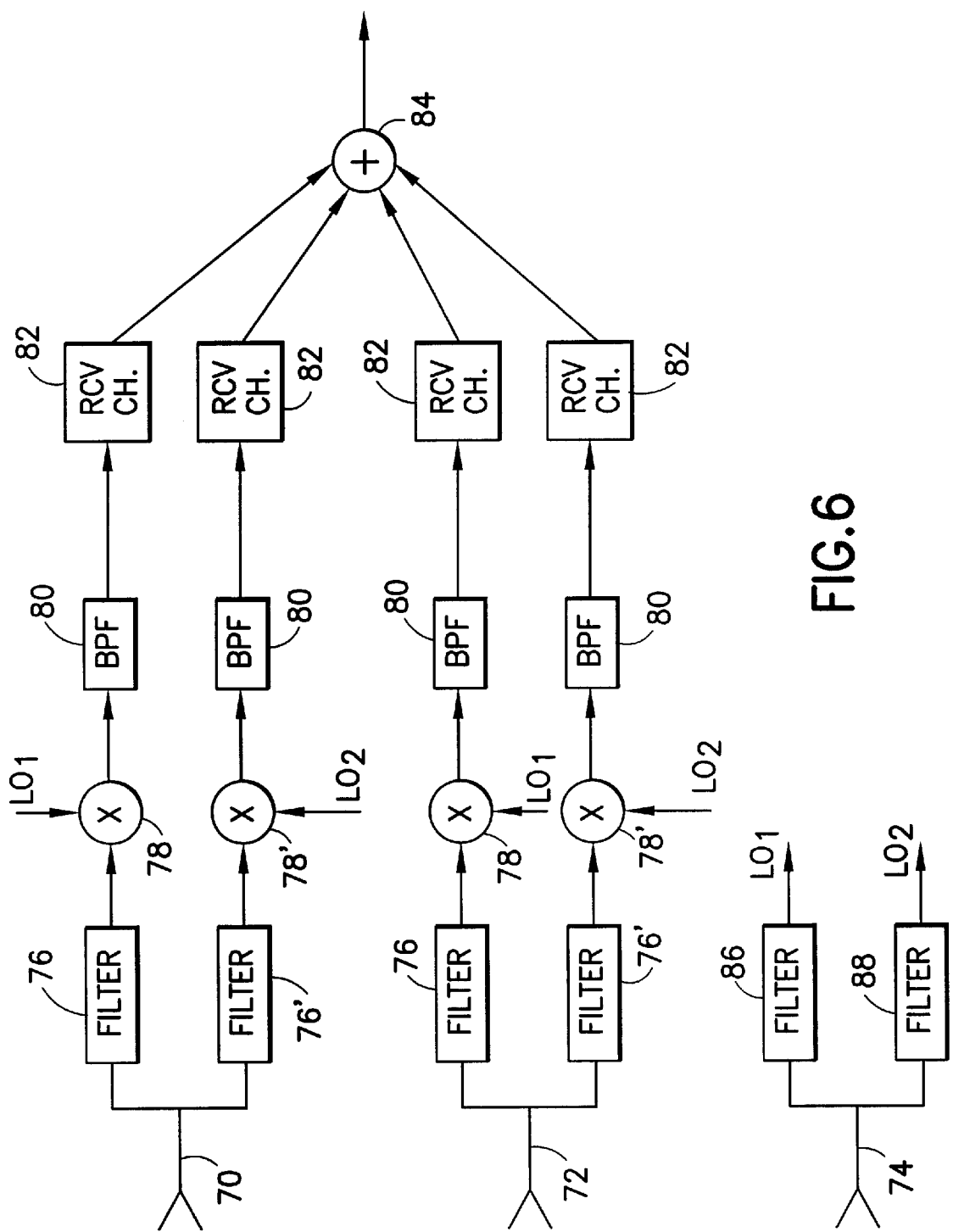
FIG. 6 is a block diagram of a receiver in accordance with the preferred embodiments of the invention.

FIG. 6, shows a preferred embodiment of the receiver wherein filters 86 and 88 are used to extract the respective carrier frequencies $f_1$ and $f_2$ from the signal communicated to the receiver via coaxial cable 74. These carrier frequencies are used by the receiver to reconstruct the transducer element output signals from the frequency division multiplexed signals received via coaxial cables 70 and 72. These reconstructed transducer element output signals are applied to respective receive channels 82, which apply the appropriate time delays and/or phase shifts needed for beamforming. The time-delayed/phase-shifted signals are then summed in a beamsummer 84.

The signals from transducer elements 2 and 6 (FIG. 5) are reconstructed via respective circuits, each circuit comprising a low-pass filter 76, a mixer 78 which receives the carrier frequency $f_1$ from filter 86, and a bandpass filter 80 coupled to a corresponding conventional receive channel 82. Similarly, the signals from transducer elements 4 and 8 (FIG. 5) are reconstructed via respective circuits, each circuit comprising a low-pass filter 76', a mixer 78' which receives the carrier frequency $f_2$ from filter 88, and a bandpass filter 80 coupled to a corresponding conventional receive channel 82.

To obtain high dynamic range in mixers 78, 78' preferably field-effect transistor-based ring modulators are used. These devices are similar to ordinary ring modulators, which use diodes and require generation of a square-wave carrier. In addition, a small transformer may be required at the input to each mixer. Since this mixer uses a square-wave local oscillator 60, 62 (FIG. 5), low-pass filters 58, 58' (FIG. 5) are required to suppress the images of the input data modulated by harmonics, but these filters, like the input bandpass filters, can be implemented using operational amplifiers.

This invention utilizes a system where the receive aperture is larger than the transmit aperture, a not unexpected result of a system which forms multiple receive beams through the volume of a single transmit beam.

A major advantage of the invention over known competing designs is that neither analog-to-digital conversion nor time-varying amplification is required in the probe. This reduces power consumption and complexity of the probe electronics, which appear to be the primary impediments to implementation of probes featuring integrated, active electronics.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. An ultrasound probe comprising first through N-th cables, an array of first through (M×N)-th ultrasonic transducer elements, and first through N-th frequency division multiplexing circuits for multiplexing output signals from a respective set of M transducer elements to a respective one of said first through N-th cables, where N and M are positive integers greater than unity, wherein said first frequency division multiplexing circuit comprises:
  a first mixer having a first input connected to receive a signal derived from an output signal of said first transducer element and a second input connected to receive a first waveform having a first carrier frequency;
  a second mixer having a first input connected to receive a signal derived from an output signal of said second transducer element and a second input connected to receive a second waveform having a second carrier frequency different than said first carrier frequency; and
  a first summer for summing first and second signals derived from the outputs of said first and second mixers respectively.

2. The probe as recited in claim 1, wherein said second frequency division multiplexing circuit comprises:
  a third mixer having a first input connected to receive a signal derived from an output signal of said third transducer element and a second input connected to receive a third waveform having said first carrier frequency;
  a fourth mixer having a first input connected to receive a signal derived from an output signal of said fourth transducer element and a second input connected to receive a fourth waveform having said second carrier frequency; and
  a second summer for summing third and fourth signals derived from the outputs of said third and fourth mixers respectively.

3. The probe as recited in claim 1, wherein said first frequency division multiplexing circuit comprises a first local oscillator which generates said first waveform and a second local oscillator which generates said second waveform.

4. The probe as recited in claim 1, wherein said first frequency division multiplexing circuit comprises:
  a first bandpass filter electrically coupled between said first transducer element and said first mixer; and
  a second bandpass filter electrically coupled between said second transducer element and said second mixer.

5. The probe as recited in claim 1, wherein said first frequency division multiplexing circuit comprises:
  a first low-pass filter electrically coupled between said first mixer and said first summer; and
  a second low-pass filter electrically coupled between said second mixer and said first summer.

6. The probe as recited in claim 1, wherein each of said N frequency division multiplexing circuits is adapted to perform single-sideband, suppressed-carrier amplitude modulation.

7. The probe as recited in claim 1, wherein each of said N frequency division multiplexing circuits is adapted to perform double-sideband, suppressed-carrier amplitude modulation.

8. The probe as recited in claim 2, further comprising an (N+1)-th cable and a third summer having a first input which receives a fifth waveform having said first carrier frequency, a second input which receives a sixth waveform having said second carrier frequency, and an output connected to said (N+1)-th cable.

9. The probe as recited in claim 1, wherein each of said first and second mixers comprises a field-effect transistor-based ring modulator.

10. A method for acquiring acoustic data reflected from biological tissue, comprising the steps of:
  transducing reflected ultrasound energy into electrical analog output signals at each one of a plurality of transducer elements; and
  frequency division multiplexing said analog output signals from said plurality of transducer elements onto an electrical conductor;
  wherein the step of frequency division multiplexing comprises:
    mixing a signal derived from an output signal of a first one of said transducer elements and a first waveform having a first carrier frequency to form a first mixed signal;
    mixing a signal derived from an output signal of a second one of said transducer elements and a second waveform having a second carrier frequency different than said first carrier frequency to form a second mixed signal; and
    summing said first and second mixed signals.

11. The method as recited in claim 10, wherein the step of frequency division multiplexing comprises single-sideband, suppressed-carrier amplitude modulation.

12. The method as recited in claim 10, wherein the step of frequency division multiplexing comprises double-sideband, suppressed-carrier amplitude modulation.

* * * * *